Jan. 12, 1960   L. W. HEISE ET AL   2,920,950
SOIL ADDITIVE AND PROCESS FOR FERTILIZING AND CONDITIONING SOIL
Filed Oct. 10, 1955
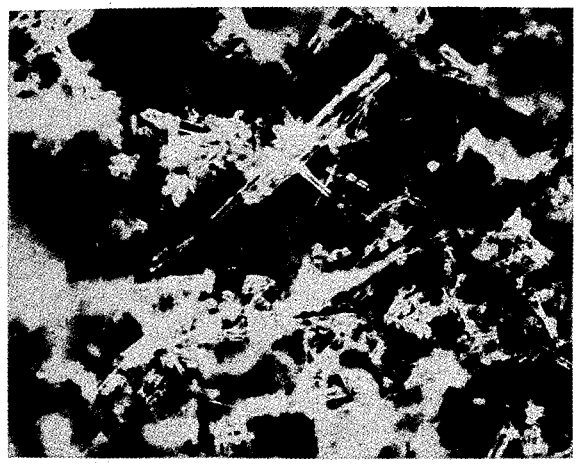
INVENTORS
LORENZ W. HEISE
MILTON JOHNSON
BY
Andrus & Sceales
Attorneys

United States Patent Office 2,920,950
Patented Jan. 12, 1960

2,920,950

SOIL ADDITIVE AND PROCESS FOR FERTILIZING AND CONDITIONING SOIL

Lorenz W. Heise and Milton Johnson, Wauwatosa, Wis., assignors to A. O. Smith Corporation, Milwaukee, Wis., a corporation of New York Application October 10, 1955, Serial No. 539,641

3 Claims. (Cl. 71—1)

This invention relates to a process for fertilizing and conditioning soil.

To obtain the maximum benefit from minerals and other fertilizing elements originally in the soil and subsequently added to the soil, the soil should be loose and not compacted so that water may pass readily therethrough to dissolve and carry the valuable fertilizing ingredients to the plant root system.

The present invention is directed to a material when combined with soil will serve to retain the loose consistency of the soil and also adds elements to the soil which aid in stimulating plant growth.

The drawing is a reproduction of a microphotograph of the present additive showing the crystalline structure thereof.

According to the invention the additive consists by weight of the following composition:

| | Percent |
|---|---|
| Ferric hydroxide ($Fe_2O_3 \cdot xH_2O$) | 25.0–40.0 |
| Trace elements | 0.01–1.0 |
| Calcium sulphate | 59–75 |

A specific illustration of the composition of the additive falling within the above ranges in weight percent is as follows:

| | Percent |
|---|---|
| Ferric hydroxide | 32.0 |
| Trace elements | 0.4 |
| Calcium sulphate | 67.6 |

The trace elements which are present in the present additive in an amount up to 1% include silicon, manganese, aluminum, magnesium, titanium, copper, chromium, nickel and lead. In addition to these elements other metals in the form of impurities may be present depending on the nature of the starting or raw materials.

The additive of the present invention when mixed with soil stimulates plant growth and also maintains the soil in a loosened condition. This action is brought about by the physical structure of the additive. As shown in the drawing, the crystals of calcium sulphate are long, needle-like and interwoven. The calcium sulphate crystals tend to separate from the iron hydroxide which is of a gelatinous nature and appears as a cloudy mass in the microphotograph. Because of the separation of the calcium sulphate crystals and because of the large size of the same, these crystals when added to the soil prevent the soil from compacting and make elements in the soil available to the plants.

The additive of the present invention is produced by the neutralization of waste pickle liquor as disclosed in Patent No. 2,692,229 of the present inventors and entitled "Disposal of Waste Pickle Liquor." By this neutralization process, waste pickle liquor containing sulphuric acid and iron salts is neutralized in a reactor tank with a slurry of lime. The lime is added to the reactor tank in controlled quantities to maintain the pH of the mixture between 7.0 to 8.0. A small amount of compressed air is added to the bottom of the reactor adjacent an agitator so that the mixture of waste pickle liquor and lime slurry is thoroughly agitated and the ferrous salts are oxidized to the ferric state.

To obtain the optimum filterability of the mixture the oxidation is controlled and only 2 to 5% of ferrous ions are oxidized to the ferric state. When this degree of oxidation has been attained, the mixture is filtered and the resulting filter cake is preferably dried, either by air drying or force drying. The dried cake can then be put into bags or can be used in the bulk state, as a soil additive.

With this process of making the additive, the calcium sulphate crystal size is increased substantially over the crystal size of calcium sulphate present in a product resulting from the complete oxidation of the ferric salts as the case in a conventional waste pickle liquor treatment process.

To show the ability of the present additive to remain loosely compacted as compared to the by-product of a conventional waste pickle liquor lime neutralization process, a quantity of the additive was placed in a 1.25 inch diameter tube 15 inches in length. Water with a pressure head of 12 inches was then passed through the additive and it required an average of 23.5 minutes for one liter of water to pass through the 15 inch column of the additive. In distinction to this, using the same operating conditions, it required an average of 1560 minutes for one liter of water under a 12 inch pressure head to pass through the 15 inch column of lime neutralized waste pickle liquor produced by a conventional treating process. By comparing the time of 23.5 minutes to 1560 minutes, it is readily apparent that the present additive remains in a loose, non-compacted condition so as to permit water to pass through the same at a much faster rate.

Generally, the additive of the present invention, when subjected to the above described test, will pass one liter of water therethrough within 20 to 90 minutes and this test shows the ability of the additive to remain loose and thereby maintain the soil in a loosened condition.

The additive is distributed onto the soil by a spreader or any other convenient means. To obtain the maximum effectiveness from the additive, it is preferred to mix or work the additive into the soil so that additive is uniformly distributed throughout the top soil. For most purposes the application of 200 to 2000 pounds of the additive per acre of soil is desirable. However, the particular amount of the additive used will depend on the nature of the soil, climatic conditions and plants to be grown.

The present additive, when combined with soil, prevents the soil from compacting and makes the elements in the soil more readily available to the plants. In addition, the additive in itself adds material to the soil which stimulates plant growth.

Various embodiments of the invention may be employed within the scope of the following claims which particularly point out and distinctly claim the subject matter regarded as the invention.

We claim:

1. A process of conditioning and fertilizing soil comprising, adding to the soil a material consisting essentially by weight of about 25% to 40% by weight of ferric hydroxide, up to 1% of trace elements and from 59–75% by weight of calcium sulphate, said material produced by the treatment of waste pickle liquor containing sulphuric acid and iron salts with lime, said treatment being characterized by improved filterability brought about by the controlled oxidation of 2% to 5% of the ferrous ions to the ferric state.

2. A process of conditioning and fertilizing soil comprising, adding to the soil a material consisting essentially by weight of about 32% of ferric hydroxide, about 0.4% of trace elements and about 67.6% of calcium sulphate, said material produced by the treatment of waste pickle liquor containing sulphuric acid and iron salts with lime, said treatment being characterized by the oxidation of 2% to 5% of the ferrous ions to the ferric state.

3. A process of conditioning and fertilizing soil comprising, adding to the soil a material consisting essentially by weight of about 25% to 40% by weight of ferric hydroxide, up to 1% of trace elements, and 59–75% by weight of calcium sulphate, said trace elements being selected from the group consisting of silicon, manganese, magnesium, aluminum, titanium, copper, chromium, nickel and lead, said material produced by the treatment of waste pickle liquor containing sulphuric acid and iron salts with lime, said treatment being characterized by the oxidation of 2% to 5% of the ferrous ions to the ferric state.

References Cited in the file of this patent

UNITED STATES PATENTS

| | | |
|---|---|---|
| 2,165,344 | Colton | July 11, 1939 |
| 2,350,982 | Borst | June 13, 1944 |
| 2,532,548 | Heide | Dec. 5, 1950 |
| 2,713,749 | Hult | July 26, 1955 |
| 2,741,876 | Paoloni | Apr. 17, 1956 |
| 2,754,623 | Mowry et al. | July 17, 1956 |